Apr. 17, 1923.
W. S. PIERCE, JR
VELOCITY INDICATOR
Filed Sept. 10, 1919
1,451,923
4 Sheets-Sheet 3
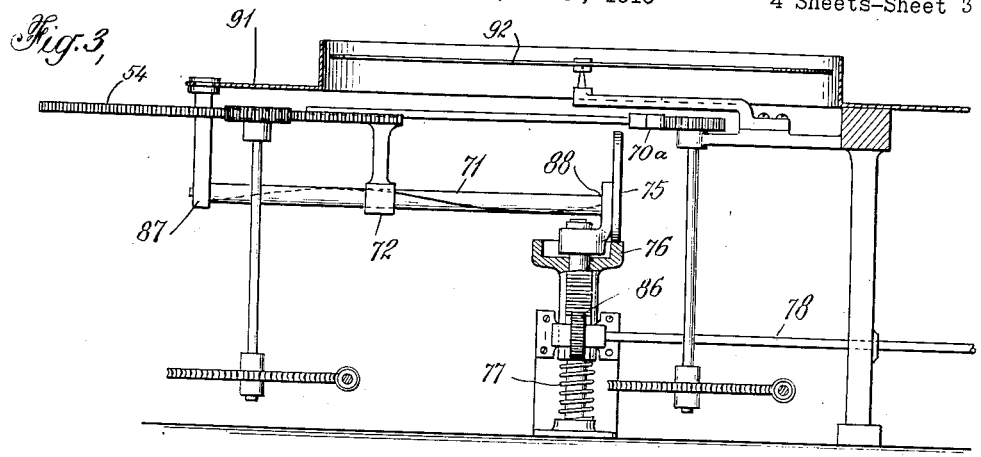
Fig. 3,
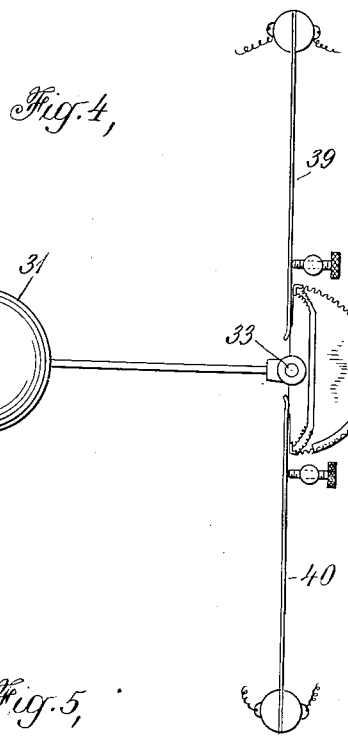
Fig. 4,
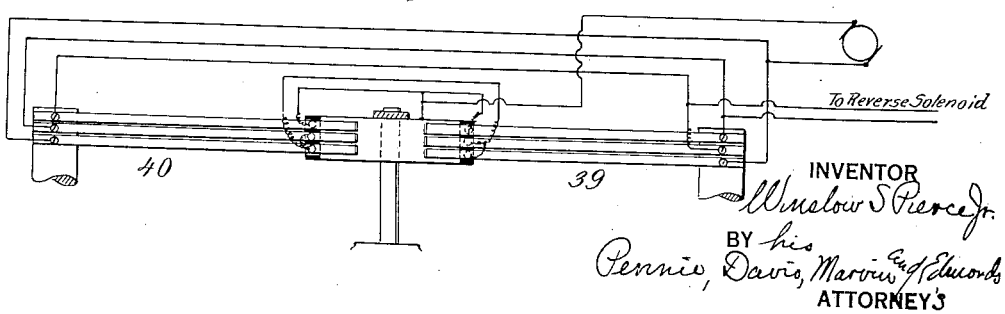
Fig. 5,
INVENTOR
Winslow S Pierce Jr.
BY his
Pennie, Davis, Marvin & Edmonds
ATTORNEYS

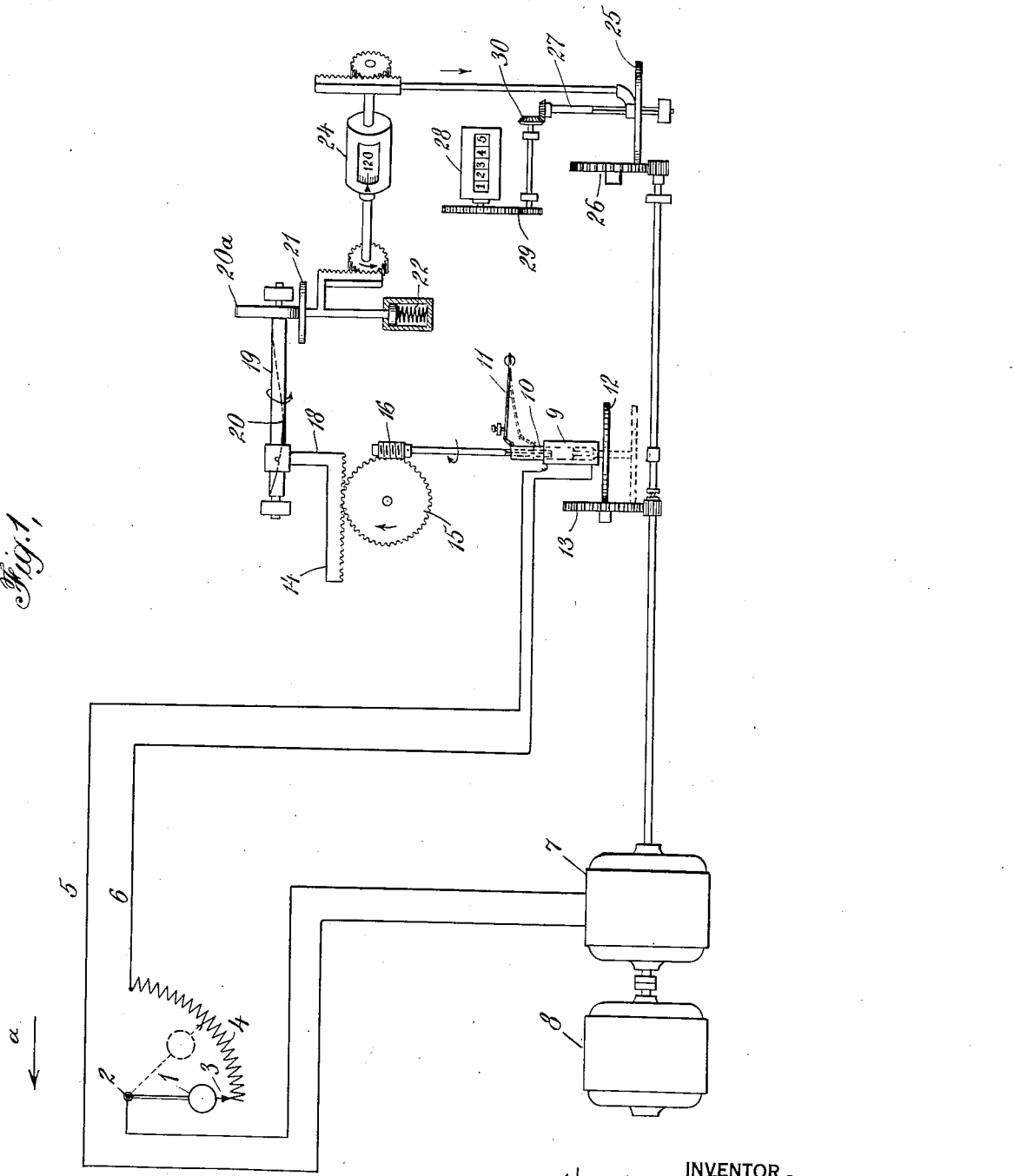

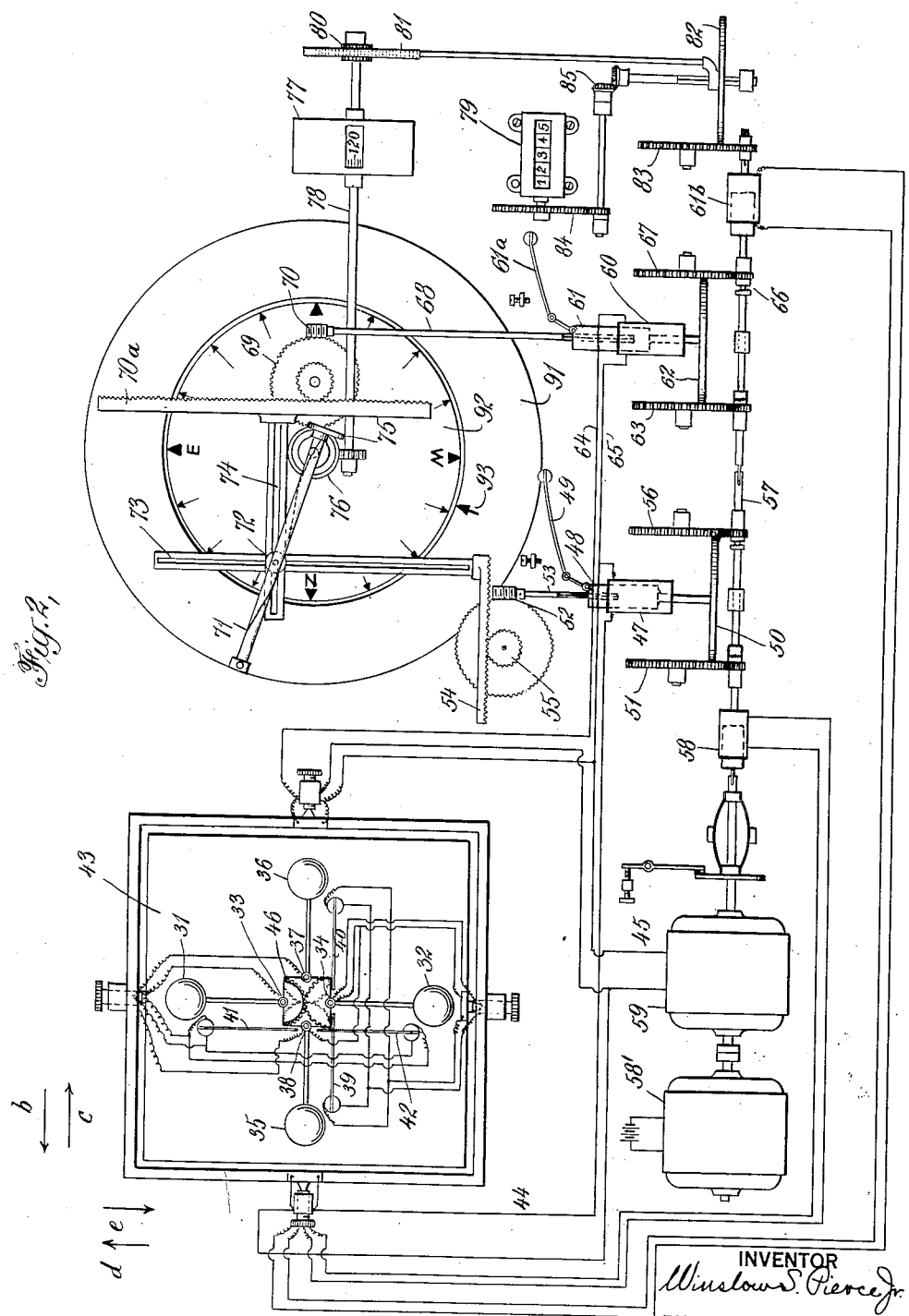

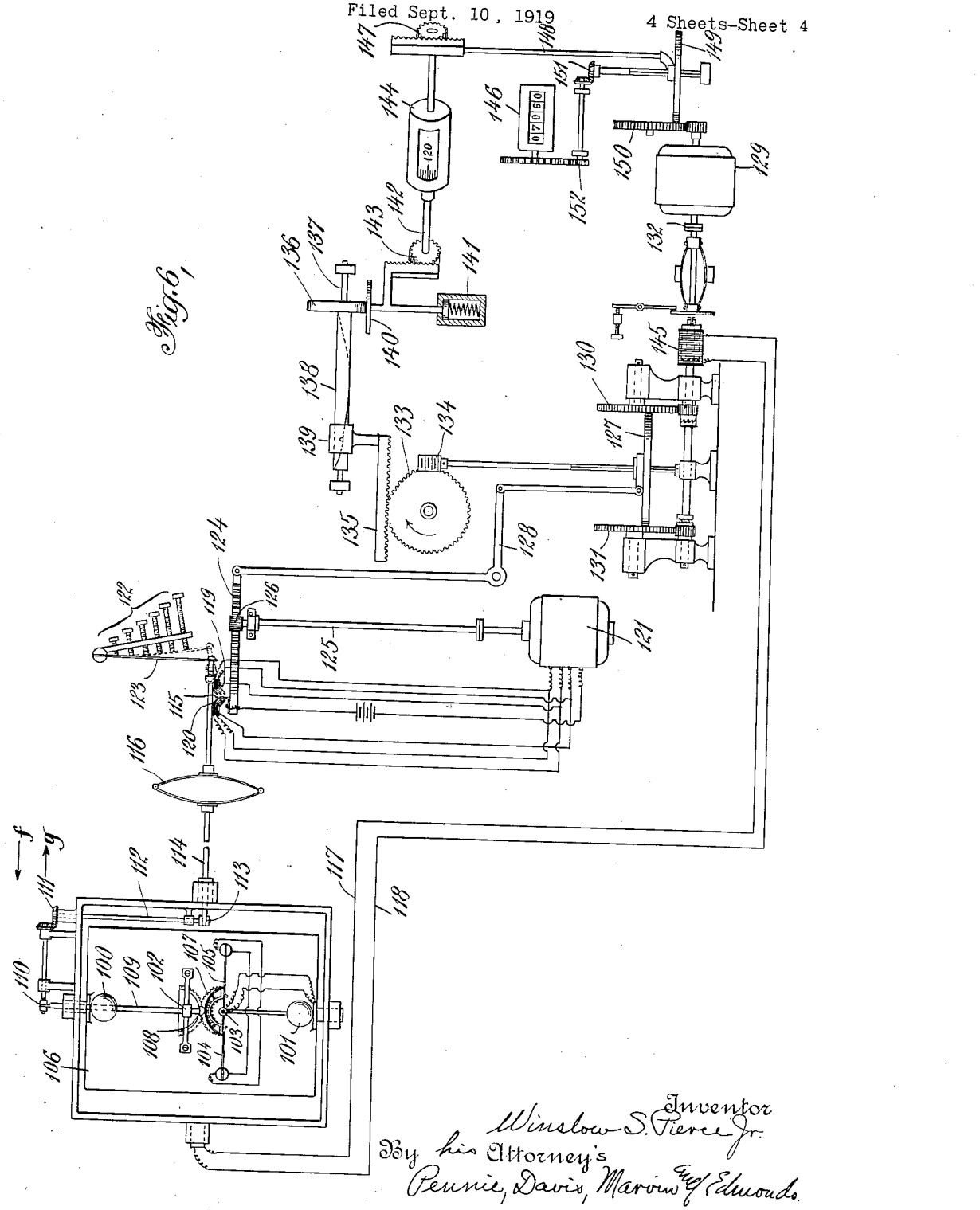

Patented Apr. 17, 1923.

1,451,923

UNITED STATES PATENT OFFICE.

WINSLOW S. PIERCE, JR., OF BAYVILLE, NEW YORK.

VELOCITY INDICATOR.

Application filed September 10, 1919. Serial No. 322,949.

*To all whom it may concern:*

Be it known that I, WINSLOW S. PIERCE, Jr., a citizen of the United States, residing at Bayville, in the county of Nassau, State of New York, have invented certain new and useful Improvements in Velocity Indicators; and I do hereby declare the following to be a full, clear, and exact description of the invention, such as will enable others skilled in the art to which it appertains to make and use the same.

This invention relates to velocity indicators, and particularly to indicators of the true velocity, or ground speed of airplanes, that is, the velocity of an airplane with respect to the ground. The invention is directed to the provision of apparatus whereby the true horizontal velocity of an airplane, irrespective of the angle of ascent or descent, is registered directly and without reference to points on the ground, or to any other observations. Moreover, the operation of the velocity indicator is unaffected by either the direction or the velocity of the wind with respect to the airplane. The velocity indicator may, therefore, be used in any weather condition permitting airplane flight.

In accordance with this invention the means for providing a measure of the force of acceleration producing the velocity comprises a system of movable weights adapted to be displaced by changes in both longitudinal and lateral acceleration. Integrating mechanism is also provided for including the element of time and combining time with the measure of the acceleration to indicate velocity. The operation of the integrating mechanism is adapted to be varied by changes in acceleration and deceleration.

The various positions or angles of ascent or descent an airplane assumes during flight tend to introduce errors into the indication of the true horizontal velocity at which the airplane is traveling. In order that the angles shall have no effect upon the operation of the velocity indicator, the portion of the apparatus which would be affected may be supported on a universal or gimbal mounting, or any other means may be utilized to maintain this portion in a plane practically horizontal with respect to the earth's surface.

The drift produced by a wind tending to blow an airplane off its course, and the sideslip of an airplane, also tend to introduce errors into the indication of the true horizontal velocity of the airplane. To eliminate the possibility of such errors entering into the resulting indication of velocity, means are provided whereby the true velocity indicated is the resultant of the longitudinal and lateral velocities. This means includes a second system of movable weights adapted to be displaced by changes in acceleration produced by drift and sideslip, the amount of the displacement of the weights being a measure of the acceleration in this direction. The measure of the lateral acceleration of the airplane and the measure of the longitudinal acceleration of the airplane are then combined with the element of time by means of the integrating mechanism to indicate velocity. Furthermore, means may be included in connection with the lateral acceleration measuring means to vary the position of the lubber line of a compass to indicate the deviation from the true course and thereby enable the navigator or pilot to correct the course for drift.

Another feature of this invention is that the movable weight systems are arranged upon a universal mounting so that the only acceleration force or component force of acceleration to which the weights will respond, is an acceleration force or a component thereof parallel to the surface of the earth. Furthermore, the mounting is so constructed that any displacement of either of the weight systems, occurring one at a time, or simultaneously, will not affect the mounting so as to unbalance it or to substantially displace it from a plane parallel to the surface of the earth.

In addition to the velocity indicating apparatus a further feature of this invention includes means for registering the true distance traveled during the flight of an airplane, that is, the distance traveled by the airplane with respect to the earth. To this end means are provided whereby the distance registered is dependent upon the true velocity at which the airplane is traveling, namely, the velocity registered upon the velocity indicator.

A more detailed understanding of this invention may be had from the following description in connection with the accompanying drawings, which show for the purpose of illustration, my invention as applied to velocity indicators for airplanes.

Fig. 1 is a diagrammatic sketch illustrating the method of operation of the velocity indicator adapted to indicate velocity in one direction only;

Fig. 2 illustrates my invention as applied to a velocity indicator for airplanes, including means for registering the distance and true course traveled by the airplane;

Fig. 3 illustrates in detail the working of the mechanism which compensates for the drift or side-slip of the airplane and which also varies the position of the compass lubber line;

Fig. 4 illustrates the method of mounting the weights, including means for varying an electrical resistance by the displacement of the weights;

Fig. 5 illustrates the method of completing the desired electrical circuits controlling the operation of the apparatus by reason of a displacement of the weights during positive or negative acceleration; and Fig. 6 illustrates a combined mechanical and electric arrangement whereby the velocity indicator is adapted to indicate velocity in a plane parallel to the surface of the earth.

In Fig. 1, a pendulum 1, supported at 2, in such a manner as to enable the pendulum to swing in one plane only, is provided with a sliding contact 3 adapted to vary the amount of resistance 4 in the electrical circuit 5, 6. The circuit 5, 6 contains a source of electrical energy, such as the dynamo 7, which may be driven at a constant speed by means of the motor 8.

A change in acceleration of an airplane carrying this apparatus and moving in the direction indicated by the arrow $a$ will tend to displace the pendulum 1 to a position, for example, such as that indicated by the dotted line. The displacement of the pendulum 1 results in the lessening of the resistance 4 in the electrical circuit 5, 6, containing the dynamo 7, and the increased current flowing in the circuit 5, 6 will serve to increase the magnetic field produced by the solenoid 9, included in the circuit 5, 6. The solenoid 9, by reason of this increase of current flowing through its winding, attracts the armature 10 to a position within the solenoid against the action of the spring 11. The movement of the armature 10, which operates to determine the position of the disc 12 against the surface of the rotating disk 13 driven by the motor 8 at a predetermined number of revolutions per minute, determines the distance of travel of the rack 14 during a displacement of the pendulum 1. The rack 14 being driven by the wheel 15 and the worm 16 on the shaft rotated by the disk 12.

The rack 14, by means of an integral arm 18, engages a helical groove 20 in the cam shaft 19. Thus when the rack 14 is actuated by reason of changes in acceleration in the direction of the arrow $a$, the cam shaft 19, carrying a cam $20^a$, is rotated. The cam $20^a$ actuates the follower 21, held in contact with the surface of the cam $20^a$, by means of a spring 22. The follower transmits its movement by a rack and gear to a velocity indicating device 24 which may be a graduated rotatable cylinder with a stationary reference line. The rotation of the shaft which actuates the device 24, serves to raise and lower the disk 25 against the surface of the disc 26, whereby the shaft 27 is driven at various revolutions per minute so as to include the element of velocity registered by the indicating device 24. The disc 26 being driven synchronously with the disc 13, serves to drive the distance indicating device 28, through the gearing 29 and the bevel gearing 30, so as to register the true distance traveled by the object at the velocity registered by the velocity indicating device 24.

The pendulum 1 will return to its vertical position during a period of uniform velocity thereby bringing the disc 12 back to a position of rest, namely, to a position at the axis of rotation of the disc 13. This results in a constant indication by the velocity indicating device of the greatest velocity attained by the moving object in the direction of the arrow $a$.

Referring now to Fig. 2, the movable weights 31 and 32 mounted on pinions 33 and 34, are adapted to be displaced by an acceleration or deceleration in the directions indicated by the arrows $b$ and $c$. The movable weights 35 and 36, mounted on pinions 37 and 38, are adapted to be displaced by an acceleration in the directions indicated by the arrows $d$ and $e$. The weights 31, 32 and 35, 36 are held in the normal position shown by means of the springs 39, 40, 41 and 42, respectively. The springs 39, 40, 41 and 42 also serve the purpose of flexible electrical contacts and complete certain circuits, which will be hereinafter described, by reason of the contact with the movable weights when the weights are displaced by the forces of acceleration.

The movable weights 31, 32, 35 and 36 are supported on a universal mounting 43, which is adapted to maintain the weights in a plane practically horizontal at all times, and thus enable the weights to be displaced by the normal acceleration in the directions indicated, independently of the angle of flight assumed by the airplane.

The purpose of the universal mounting 43 will be more readily understood from the following example: An airplane is three miles above a point on the earth's surface, which is four miles distant from a second point. The airplane travels the distance from the air over the first point to the ground at the second point in a period of four minutes. My improved velocity indicator will register sixty miles per hour, although the actual distance traveled in the air is five miles. This result is obtained because of the horizontal position assumed by the weights due to the fact that the universal mounting 43 maintained the weights in that position, thereby subjecting the weights to the horizontal component only of the actual acceleration along a path joining the point in the air with the point on the ground.

The weights 31 and 32, when displaced by reason of changes in acceleration, vary the resistance of the circuit 44, 45, by means of a variable resistance 46, located on the weight 31, in such a way as to increase the flow of current through the solenoid 47. The increase of current flow through the windings of the solenoid 47 will tend to attract the armature 48 against the action of the spring 49 to a position within the solenoid 47. The armature 48 by reason of its displacement serves to position the rotating disc 50 against the rotating disc 51 in the well known manner. The worm and wheel 52 is rotated by means of the shaft 53, which is rotated by the disc 50. This rotation causes the rack 54 in mesh with the gear 55 to be moved either forward or backward, according to whether the disc 51 is rotating the disc 50, or whether the disc 56 is rotating the disc 50. The rotating disc 56 idles upon the shaft 57, when the airplane is being positively accelerated but when the airplane is slowing down or being negatively accelerated, the movable weights 31 and 32 will be displaced in such a manner as to complete an electrical circuit serving to energize the solenoid 58 which actuates a clutch whereby the disc 56 is driven by the shaft 57 and the disc 51 is simultaneously released to idle on the shaft 57.

The shaft 57 is driven by a motor 58' adapted to rotate at a constant number of revolutions per minute and it is directly connected to the dynamo 59, designed to furnish the necessary current for energizing the solenoids 47, 58, 60 and 61$^b$.

When the airplane is accelerated laterally, due to side-slip or drift, the weights 35 and 36 are displaced either in one direction or another, with respect to their axes of rotation about the pinions 37 and 38. The amount of displacement of the weights 35 and 36, as in the case of the weights 31 and 32, serves to vary the resistance of an electrical circuit 64, 65, including the solenoid 60. The increased current flowing in the windings of the solenoid 60 produces a strong magnetic field which attracts the armature 61 against the action of the spring 61$^a$, to a position within the solenoid 60. The movement of the armature 61 serves to position the disc 62 against the surface of the rotating disc 63 on the shaft 57. The distance the disc 62 is moved toward the periphery of the disc 63 is dependent upon the strength of the magnetic field produced by the solenoid 60, which, in turn, is determined by the amount of resistance in the circuit 64, 65, introduced by the displacement of the weights 35, 36.

Acceleration in an opposite direction to the acceleration producing the effects described above, displaces the weights 35 and 36 in the opposite direction and thereby energizes the solenoid 61$^b$, which serves to connect the shaft 57 by means of the clutching mechanism 66, to the disc 67. The disc 67 will drive the disc 62 in the opposite direction from that when the disc 62 is driven by the disc 63. The speed of rotation of the disc 62, when driven by the disc 67, is, as in the case of the disc 63, dependent upon the amount the armature 61 is actuated by the solenoid 60. In either case, the rotation of the disc 62 drives the shaft 68 and the wheel 69 by means of a worm 70, the direction of rotation of the shaft 68 being determined by the direction of displacement of the weights 35, 36. The wheel 69 serves to move a rack 70$^a$ in one direction or another, dependent upon the direction of rotation of the shaft 68.

The combined movements of the racks 54 and 70$^a$ are transmitted to a helically grooved shaft 71, by means of a collar 72, fixed in the slots 73 and 74 of arms integral with the racks 54 and 70$^a$. The collar 72, having a pin integral therewith and adapted to fit in the groove, rotates the helically grooved shaft 71 during a movement of the rack 54 or the rack 70$^a$. A logarithmic cam 75, or its equivalent, is mounted at one extremity of the shaft 71 and the cam follower 76 is adapted to be held in contact with the surface of the cam 75 in any suitable manner so that the rotation of the cam 75 will actuate the velocity indicating device 77 through a rack attached to the follower 76 and a gear on the shaft 78, upon which is mounted the indicating device 77.

The operation of the cam shaft 71 with particular relation to relative movements of the slots 73 and 74 will be understood from the following example: An airplane is constantly accelerated in the direction due north, so as to produce a velocity of forty miles per hour in that direction. A wind blowing due east at a velocity of thirty miles per hour would tend to drift the airplane at the same velocity. As a result of the longitudinal acceleration, the rack 54 would travel a distance proportional to a displacement of the weights 31 and 32. The rack 70ª would travel a distance proportional to the displacement of the weights 35, 36, due to the acceleration produced by the wind. It is obvious that the resultant velocity indicated would be fifty miles per hour, the velocity indicated being the resultant velocity produced by two forces at right angles.

The distance traveled by the airplane at any given velocity indicated by the velocity indicating device 77, would be registered on the distance indicating device 79 in the following manner: The rack 81 actuated by a gear 80 mounted on the shaft 78, serves to position the disc 82 in contact with the rotating disc 83. The distance the disc 82 is moved toward the periphery of the rotating disc 83 determines the number of revolutions per minute made by the disc 82, the disc 83 being rotated at a predetermined number of revolutions per minute. It will be seen, therefore, that the revolutions per minute made by the disc 82 is dependent upon the position of the rack 80 which is directly controlled by the velocity indicating device 77. The distance traveled by the airplane for any given time interval is thereby registered on the distance indicating device 79, at a rate dependent on the velocity registered on the velocity indicating device 77, the distance indicating device being actuated by the disc 82 through the bevel gearing 85 and the gearing 84.

Referring now to Fig. 3, 75 is a cam mounted on the shaft 71. The cam follower 76 is held against the surface of the cam 75 by means of a spring 77, and serves to rotate the velocity indicating device shaft 78 through the rack and gear 86. The method of supporting the shaft 71 is shown at 87 and 88, so that any movement of the rack 70ª or the rack 54 will serve to displace the collar 72, thereby rotating the shaft 71.

The support 87 is attached to the compass box 91 carrying a lubber line 93, shown in Fig. 2, adapted to be rotated about the compass needle 92 by a movement of the shaft 71 when the airplane is laterally accelerated. The lubber line 93 will be displaced in proportion to the lateral acceleration and velocity thereby furnishing a constant indication of the true course of the airplane while drifting.

Referring now to Fig. 4, the resistance 89 is adapted to be connected in an electrical circuit and varied by means of the contact 90 when the weights 31 or 32 are rotated about the pinions 33 and 34. The contacts 39 and 40 are adapted to close the circuits controlling the action of the solenoids 47 and 58. The contacts 41 and 42 serve a similar purpose in connection with the weights 35 and 36, and control the electrical circuits containing the solenoids 60 and 61ᵇ.

The springs 39 and 40 serve to retain the weights 31 and 32 in the normal position shown, during zero acceleration or uniform velocity. The contacts 41 and 42 perform this same function for the weights 35 and 36.

In Fig. 5 I have shown a method of completing the circuit connections of a circuit including either the contacts 39 and 40, or the contacts 41 and 42, so as to furnish current to the winding of the solenoids 47 and 58 or the solenoids 60 and 61ᵇ. The energizing of either the solenoid 58 or the solenoid 61ᵇ, as explained above, results in the reversal of the direction of rotation of the discs 50 and 62, respectively. The reversal of the direction of rotation of the disc 50 as a result of negative longitudinal acceleration serves to operate rack 54 in such a manner as to decrease the amount of velocity registered on the velocity indicating device 77. In a similar manner, the reversal of the direction of rotation of the disc 62, in the case of negative lateral acceleration, will decrease the amount of velocity registered upon the velocity indicating device 77.

Referring now to Fig. 6, movable weights 100 and 101 are mounted on pinions 102 and 103, respectively. These weights are adapted to be displaced by an acceleration force in the directions indicated by the arrows *f* and *g*. The weights 100 and 101 are held in the normal position shown by means of the springs 104 and 105 which also serve for the purpose of flexible electric contacts to complete certain circuits when the movable weights are displaced by the forces of acceleration.

The movable weights 100 and 101 are supported on a universal mounting 106, which is adapted to maintain the weights in a plane substantially horizontal at all times, thereby enabling the weights to be displaced by the normal acceleration forces in the directions indicated, independently of the angle of flight assumed by the airplane.

When the weights 100 and 101 are displaced by reason of changes in acceleration, the cam surface 107 operates to raise the cam follower 108 on the rod 109. The rod 109 actuates the crank 110 in such a manner as to rotate the bevel gearing 111. The gearing 111 turns the crank 113 by means of the rod 112 connecting the crank with the gearing. The crank 113 is operatively connected to the shifting rod 114 which in turn operates an electrical contact 115 through the eliptical spring 116 which serves to reduce the retarding effect induced by the contact 115 on the rod 114.

It will be seen that when the weights 100 and 101 are acted upon by an acceleration force in the direction of the arrow *f*, the weights will be displaced in the opposite direction. If the weights are acted upon by an acceleration force in the direction of the arrow *g*, the weights will be displaced in the opposite direction. This opposite displacement of the weights 100 and 101, due to the action of accelerative forces or decelerative forces, is made use of in conjunction with the electrical contact springs 104 and 105 to energize the electrical circuit 117 and 118.

The electrical contact 115 when operatively in contact with the reversing contacts 119 or 120 energizes the electric motor 121 which rotates in one direction or another, in accordance with the direction of the acceleration forces acting on the weights 100 and 101. A further means of absorbing the resistance on the rod 114 resulting from the contact 115, is shown at 122 as a series of adjustable screws acting upon a leaf spring 123. When the contact 115 is displaced towards the spring 123, the electric motor 121 will actuate the rack 124 to lower the rotating disc 127 through the lever 128.

An electric motor 129 rotates the discs 130 or 131 through the shaft 132. It will, therefore, be seen that if the rotating disc 127 is lowered against the rotating disc 130, the wheel 133 will be rotated by the worm 134 so that the wheel will displace the rack 135. The rack 135 actuates the cam 136 mounted on the shaft 137 by means of a helically grooved shaft 138. This helically grooved shaft is operatively engaged by a pin in a collar 139 which is integral with the rack 135. The cam follower 140 which is held against the surface of the cam 136 by means of a spring plunger 141, will in its downward movement rotate the shaft 142 through the rack and gear 143. A rotation of the shaft 142 operates the velocity indicating device 144.

When the weights 100 and 101 are displaced in an opposite sense to an acceleration acting in the direction of the arrow $g$ the solenoid 145 will be energized and thereby cause the shaft 132 to rotate the disc 131. When the disc 127 is lowered against the disc 131, the cam 136 will be operated in an opposite direction to that described above when the disc 127 is operated by the rotating disc 130, that is, the velocity indicating device 144 will be rotated negatively and the amount of its registration will be lessened.

The distance traveled by an airplane at any given velocity indicated by the velocity indicating device 144 will, as in the apparatus of Fig. 2, be registered on the distance indicating device 146 by means of the rack and gear 147 actuated by the shaft 142. The rod 148 serves to raise and lower the rotating disc 149 against the disc 150 which is rotated by means of the electric motor 129.

The distance the disc 149 is moved toward the periphery of the driving disc 150 determines the number of revolutions per minute made by the disc 149. It will be seen, therefore, that the revolutions per minute made by the disc 149 is dependent upon the position of the rack 147 which is directly controlled by the velocity indicating device 144. The distance travelled by the airplane for any given time is, therefore, registered on the distance indicating device 146 at a rate dependent on the velocity registered on the velocity indicating device 144. The distance indicating device 146 being actuated by the disc 149 through the beveled gearing 151 and gearing 152.

While I have shown and described my invention as applied particularly to velocity indicators for airplanes, it should be understood that various modifications may be made in the system of weights displaced by the forces of acceleration and that various equivalents may be substituted for the integrating mechanism without departing from the spirit and scope of my invention.

I claim:

1. A velocity indicator comprising a system of movable weights adapted to be displaced by changes in acceleration, said displacement being a measure of the acceleration, integrating mechanism including electrical circuits controlling the operation of said mechanism, said mechanism adapted to combine the element of time with the measure of acceleration and means for registering the integrated product to indicate velocity.

2. A velocity indicator comprising a system of movable weights, a part of said system adapted to be displaced by changes in acceleration in one direction, and another part of said system adapted to be displaced during changes in acceleration in a direction 90° from said first direction, said respective displacements being a measure of the acceleration in each direction, means for obtaining the measure of the resultant acceleration including integrating mechanism adapted to combine the element of time with the measure of the resultant acceleration, and means for registering the integrated product to indicate velocity.

3. A velocity indicator comprising a system of movable weights, a part of said system adapted to be displaced by changes in acceleration in one direction, and another part of said system adapted to be displaced by changes in acceleration in a direction 90° from said first direction, means for obtaining the measure of the resultant acceleration including electrically controlled integrating mechanism adapted to combine the element of time with the measure of the resultant acceleration, and means for registering the integrated product to indicate velocity.

4. A velocity indicator comprising a plurality of rotatably mounted weights, a number of said weights adapted to be rotated by changes in acceleration in one direction and the remainder adapted to be rotated by changes in acceleration in a direction at rightangles to said first direction, means for obtaining the measure of the resultant acceleration including resistances connected in electrical circuits containing sources of current and adapted to be varied by the rotation of said weights, said resistance variation arranged to control the operation of integrating mechanism adapted to combine the element of time with the measure of the resultant acceleration and means for registering the integrated product to indicate velocity.

5. A velocity indicator comprising a system of universally mounted movable weights adapted to be displaced by changes in acceleration in a plane horizontal to the earth's surface, said displacement being a measure of the acceleration, integrating mechanism adapted to combine the element of time with the measure of acceleration, a motor for actuating said mechanism, means for controlling the application of said motor to said mechanism in accordance with the displacement of said weights, and means for registering the integrated product of time and the measure of acceleration to indicate velocity.

6. A velocity indicator comprising a system of universally mounted movable weights adapted to be displaced by changes in acceleration in a horizontal plane, a part of said system adapted to be displaced by changes in acceleration in one direction in said plane, another part of said system adapted to be displaced by changes in acceleration in a direction at rightangles to said first direction in said plane, said respective displacements being a measure of the acceleration in each direction, integrating mechanism adapted to obtain the measure of the resultant acceleration and to combine said measure with the element of time, a motor for actuating said mechanism, means for controlling the application of said motor to said mechanism in accordance with the displacement of said weights and means for registering the integrated product of time and the measure of acceleration to indicate velocity.

7. A velocity indicator comprising means adapted to be displaced by acceleration and deceleration, said respective displacements being a measure of the acceleration or deceleration, integrating mechanism adapted to combine the element of time with the measure of acceleration or deceleration, and means for registering the integrated product to indicate velocity, said acceleration producing a positive operation and said deceleration producing a negative operation of said registering means.

8. A velocity indicator comprising means adapted to be displaced by changes in acceleration, said displacement being a measure of the acceleration, integrating mechanism adapted to combine the element of time with the measure of acceleration, a motor for actuating said mechanism, means for registering the integrated product of time and the measure of acceleration to indicate velocity, and means actuated by said motor for registering the distance traveled at the velocity indicated.

9. A velocity indicator comprising means for measuring changes in the horizontal component of an acceleration acting along the longitudinal axis of a moving object, means for measuring changes in the horizontal component of an acceleration acting laterally thereto, integrating mechanism adapted to obtain the resultant of said respective acceleration measures and to combine the resultant of the acceleration measures with the element of time, means for registering the integrated product to indicate velocity, a compass, a reference or lubber line therefor, and means for moving said reference line about the axis of the compass in accordance with changes in lateral acceleration whereby the true course of the moving object is constantly indicated at the velocity registered.

In testimony whereof I affix my signature.

WINSLOW S. PIERCE, Jr.